United States Patent
Jang et al.

(10) Patent No.: US 8,420,182 B2
(45) Date of Patent: Apr. 16, 2013

(54) METHOD OF MANUFACTURING POLYMER DISPERSED LIQUID CRYSTAL DISPLAY DEVICE INCLUDING DICHROIC DYE

(75) Inventors: Jae-eun Jang, Seoul (KR); Jae-eun Jung, Seoul (KR); Gae-hwang Lee, Hwaseong-si (KR); Jin-woo Lee, Seoul (KR); Young-jae Jun, Seoul (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 499 days.

(21) Appl. No.: 12/659,155

(22) Filed: Feb. 26, 2010

(65) Prior Publication Data

US 2011/0039032 A1 Feb. 17, 2011

(30) Foreign Application Priority Data

Aug. 14, 2009 (KR) .................. 10-2009-0075340

(51) Int. Cl.
*B05D 3/06* (2006.01)

(52) U.S. Cl.
USPC ........... 427/508; 427/510; 427/466; 427/472; 427/474; 427/493; 427/74; 427/75

(58) Field of Classification Search .................. None
See application file for complete search history.

(56) References Cited

U.S. PATENT DOCUMENTS

| | | | | |
|---|---|---|---|---|
| 5,305,126 A | * | 4/1994 | Kobayashi et al. | 349/94 |
| 5,953,089 A | * | 9/1999 | Hiji et al. | 349/112 |
| 6,108,062 A | * | 8/2000 | Takeuchi et al. | 349/88 |
| 2001/0001569 A1 | * | 5/2001 | Lawandy | 349/193 |
| 2004/0169813 A1 | * | 9/2004 | Liang et al. | 349/187 |
| 2006/0262249 A1 | * | 11/2006 | Liang | 349/86 |
| 2007/0268427 A1 | * | 11/2007 | Uehara | 349/62 |
| 2008/0316395 A1 | * | 12/2008 | O'Keeffe | 349/88 |
| 2010/0134723 A1 | * | 6/2010 | Evans | 349/69 |
| 2010/0279125 A1 | * | 11/2010 | Buyuktanir et al. | 428/432 |

FOREIGN PATENT DOCUMENTS

| | | |
|---|---|---|
| JP | 05-061023 | 3/1993 |
| JP | 5-142580 | 6/1993 |
| JP | 08-095009 | 4/1996 |
| JP | 08-095010 | 4/1996 |
| KR | 10-0582990 | 5/2006 |

OTHER PUBLICATIONS

Abstract and partial machine translation of JP08-095010, Apr. 1996.*

* cited by examiner

*Primary Examiner* — Erma Cameron
(74) *Attorney, Agent, or Firm* — Harness, Dickey & Pierce, P.L.C.

(57) ABSTRACT

Example embodiments relate to a method of manufacturing a polymer dispersed liquid crystal (PDLC) display device including dichroic dye. The method may include filling a mixture solution including liquid crystals, a photopolymerizable material, dichroic dyes, and liquid crystalline polymers in a space between a first electrode and a second electrode that face each other; applying an electric field between the first electrode and the second electrode; and arranging the dichroic dyes in the mixture solution.

21 Claims, 6 Drawing Sheets

METHOD OF MANUFACTURING POLYMER DISPERSED LIQUID CRYSTAL DISPLAY DEVICE INCLUDING DICHROIC DYE

CROSS-REFERENCE TO RELATED APPLICATION

This application claims priority under 35 U.S.C. §119 to Korean Patent Application No. 10-2009-0075340, filed on Aug. 14, 2009 with the Korean Intellectual Property Office, the entire disclosure of which is incorporated herein by reference.

BACKGROUND

1. Field

Example embodiments relate to a method of manufacturing a polymer dispersed liquid crystal (PDLC) display device including a dichroic dye.

2. Description of the Related Art

Conventional polymer dispersed liquid crystal (PDLC) display devices change a refractive index of a polymer and liquid crystals and scatter or transmit light by applying an electric field to a PDLC layer in which the polymer and the liquid crystals are uniformly mixed. The PDLC display device may transmit or reflect light by using only an electric field and without using an alignment layer and a polarizer. In addition, when dichroic dyes are mixed in the PDLC layer, a display device having improved contrast may be realized. When the dichroic dyes are mixed with liquid crystals, the dichroic dyes may be arranged according to the movement of the liquid crystals. Accordingly, when the dichroic dyes are mixed in the PDLC layer, the dichroic dyes may be arranged as a result of the movement of the liquid crystals or may be randomly distributed. Thus, an optical change may occur.

A PDLC display device including dichroic dyes is conventionally manufactured by injecting a mixture solution of liquid crystals, a photopolymerizable material, and dichroic dyes between two electrodes that face each other and by hardening the mixture solution by using ultraviolet rays. The photopolymerizable material denotes a material which becomes a polymer due to a photopolymerization reaction and may include monomers or oligomers. Because of the hardening process using ultraviolet rays, the liquid crystals are uniformly dispersed in the polymer, and the dichroic dyes uniformly exist in the polymer and the liquid crystals. However, the dichroic dyes existing in the polymer may affect optical characteristics of the display device. For instance, the dichroic dyes existing in the polymer may not move due to the hardening process using ultraviolet rays. The immovable dichroic dyes may not have optical anisotropy and, thus, may adversely affect visibility of the display device. In addition, the dichroic dyes existing in the polymer during the hardening process using ultraviolet rays continuously absorbs ultraviolet rays and, thus, may deteriorate hardening characteristics.

To address the above problems, a method of applying an electric field to a mixture solution of liquid crystals, a photopolymerizable material, and dichroic dyes before performing the hardening process using ultraviolet rays and thus uniformly arranging the liquid crystals and the dichroic dyes in the electric field has been introduced. However, in this method, the dichroic dyes may not be arranged in a regular direction in the polymer. In a mixture solution in which the photopolymerizable material (which may be monomers or oligomers), the liquid crystals, and the dichroic dyes are uniformly mixed is prepared, the liquid crystals may lose their electric characteristic in the mixture solution. To arrange the dichroic dyes in a line, the liquid crystals may be first arranged in a line by applying an electric field and then the dichroic dyes are arranged in a line by the movement of the liquid crystals. However, the electric characteristic of the liquid crystals is lost in the mixture solution of the liquid crystals, the photopolymerizable material, and the dichroic dyes.

Thus, even when an electric field is applied to the mixture solution, the dichroic dyes are not arranged in a line but remain randomly arranged in the mixture solution. In order for the liquid crystals to maintain their electric characteristics in the mixture solution, phase separation may occur to some degree in the liquid crystals and the photopolymerizable material after the photopolymerization reaction using ultraviolet rays. However, in the above method, an electric field is applied before the photopolymerization reaction occurs and thus the dichroic dyes existing in the mixture solution may not be arranged in a line even by application of an electric field. Accordingly, in the above method, the dichroic dyes existing in the polymer are not arranged in a line but are arranged randomly even after an electric field is applied and the hardening process using ultraviolet rays is performed. Thus improvements in visibility and ultraviolet rays hardening characteristic may not occur.

SUMMARY

Example embodiments relate to a method of manufacturing a polymer dispersed liquid crystal (PDLC) display device including a dichroic dye. A method of manufacturing a polymer dispersed liquid crystal (PDLC) display device may include providing a mixture solution including liquid crystals, a photopolymerizable material, dichroic dyes, and liquid crystalline polymers between a first electrode and a second electrode; applying an electric field between the first electrode and the second electrode; irradiating the mixture solution with ultraviolet rays while the electric field is being applied so as to form a PDLC layer including the liquid crystals, a polymer, the dichroic dyes, and the liquid crystalline polymers; and removing the electric field applied between the first electrode and the second electrode.

The dichroic dyes in the mixture solution may be arranged in parallel to the electric field when the electric field is applied between the first electrode and the second electrode. The dichroic dyes within the polymer of the PDLC layer may maintain their arrangement even after the removal of the electric field. The concentration of the liquid crystalline polymers in the mixture solution may be about 5 to about 25 weight %. The concentration of the photopolymerizable material in the mixture solution may be about 5 to about 25 weight %. The photopolymerizable material may include at least one material selected from the group consisting of monomers and oligomers. The first and second electrodes may be formed of a transparent conductive material. The first electrode and the second electrode may be respectively formed on a first substrate and a second substrate. The first and second substrates may be transparent substrates.

Another method of manufacturing a polymer dispersed liquid crystal (PDLC) display device may include providing a mixture solution including liquid crystals, a photopolymerizable material, dichroic dyes, and liquid crystalline polymers between a first electrode and a second electrode; arranging a third electrode and a fourth electrode so as to sandwich the first electrode and the second electrode; applying an electric field between the third electrode and the fourth electrode; irradiating the mixture solution with ultraviolet rays while the electric field is being applied so as to form a PDLC layer including the liquid crystals, a polymer, the dichroic dyes, and the liquid crystalline polymers; and removing the third electrode and the fourth electrode. At least one of the third electrode and the fourth electrode may be formed of a transparent conductive material.

Another method of manufacturing a polymer dispersed liquid crystal (PDLC) display device may include providing a mixture solution including liquid crystals, a photopolymerizable material, dichroic dyes, and liquid crystalline polymers between a first electrode and a second electrode; applying an electric field between the first electrode and the second electrode; irradiating the mixture solution with ultraviolet rays while the electric field is being applied so as to form a PDLC layer including the liquid crystals, a polymer, the dichroic dyes, and the liquid crystalline polymers; removing the electric field applied between the first electrode and the second electrode; and removing the first electrode from the PDLC layer and providing a third electrode in its place.

According to example embodiments, because the dichroic dyes in the polymer of the PDLC layer are arranged before a hardening process using ultraviolet rays, the visibility of the PDLC display device may be improved. Also, because the dichroic dye arranged in the polymer allow the penetration of more ultraviolet rays during the hardening process, a hardening characteristic of the polymer may be improved. Furthermore, the performance deterioration of the dichroic dyes resulting from the absorption of ultraviolet rays may be reduced or prevented.

BRIEF DESCRIPTION OF THE DRAWINGS

The above and/or other aspects of example embodiments may become more apparent and readily appreciated when the following detailed description is taken in conjunction with the accompanying drawings of which.

DETAILED DESCRIPTION

It will be understood that when an element or layer is referred to as being "on," "connected to," "coupled to," or "covering" another element or layer, it may be directly on, connected to, coupled to, or covering the other element or layer or intervening elements or layers may be present. In contrast, when an element is referred to as being "directly on," "directly connected to," or "directly coupled to" another element or layer, there are no intervening elements or layers present. Like numbers refer to like elements throughout the specification. As used herein, the term "and/or" includes any and all combinations of one or more of the associated listed items.

It will be understood that, although the terms first, second, third, etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, a first element, component, region, layer, or section discussed below could be termed a second element, component, region, layer, or section without departing from the teachings of example embodiments.

Spatially relative terms, e.g., "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" may encompass both an orientation of above and below. The device may be otherwise oriented (rotated 90 degrees or at other orientations) and the spatially relative descriptors used herein interpreted accordingly.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "comprises" "comprising", "includes" and/or "including" when used in this application, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the shapes of regions illustrated herein but are to include deviations in shapes that result, for example, from manufacturing. In sum, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art. It will be further understood that terms, including those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be described more fully with reference to the accompanying drawings. In the drawings, like reference numerals denote like elements, and the thicknesses of layers and/or regions may have been exaggerated for added clarity.

Figure 1:
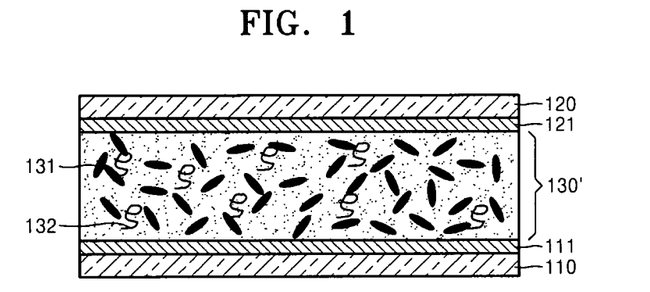
FIGS. 1 through 4 illustrate a method of manufacturing a polymer dispersed liquid crystal (PDLC) display device according to example embodiments.

FIGS. 1 through 4 illustrate a method of manufacturing a polymer dispersed liquid crystal (PDLC) display device according to example embodiments. Referring to FIG. 1, a first electrode 111 and a second electrode 121 may be disposed facing each other at a regular interval. The first and second electrodes 111 and 121 may be formed of a transparent conductive material. For example, the first and second electrodes 111 and 121 may be formed of an indium tin oxide (ITO). However, the first and second electrodes 111 and 121 according to example embodiment are not limited thereto. The first electrode 111 and the second electrode 121 may be respectively formed on a first substrate 110 and a second substrate 120. The first substrate 110 (e.g., a lower substrate) and the second substrate 120 (e.g., an upper substrate) may be transparent substrates (e.g., a glass substrate or a plastic substrate). Although not illustrated, thin film transistors (TFTs) and driving wirings may be formed on the first substrate 110 along with the first electrode 111.

A mixture solution 130' is filled in the space between the first electrode 111 and the second electrode 121. The mixture solution 130' may be prepared by mixing liquid crystals, a photopolymerizable material, dichroic dyes 131, and liquid crystalline polymers 132. The photopolymerizable material is a material which becomes a polymer as a result of a photopolymerization reaction. The photopolymerizable material may include at least one material selected from the group consisting of monomers and oligomers. In the mixture solution 130', the concentration of the photopolymerizable material may be about 5 to about 25 weight %. However, the concentration of the photopolymerizable material is not limited thereto. The dichroic dyes 131 may be of various colors, for example, black, yellow, magenta, red, green, or blue. However, the dichroic dyes 131 according to example embodiments are not limited thereto. When the dichroic dyes 131 are mixed with the liquid crystals, the dichroic dyes 131 may be arranged according to movement of the liquid crystals.

The liquid crystalline polymers 132 may be polymers having liquid crystalline properties in a solution or a molten state. Because of the liquid crystalline polymers 132, the liquid crystals around the liquid crystalline polymers 132 do not lose their electrical property. For instance, if the mixture solution 130' only includes the liquid crystals, the photopolymerizable material, and the dichroic dyes 131, the liquid crystals lose their electrical property. However, according to example embodiments, when the liquid crystalline polymers 132 are included in the mixture solution 130', the liquid crystals around the liquid crystalline polymers 132 maintain their electrical property. The concentration of the liquid crystalline polymers 132 in the mixture solution 130' may be about 5 to about 25 weight %. However, the concentration of the liquid crystalline polymers 132 is not limited thereto.

Figure 2:
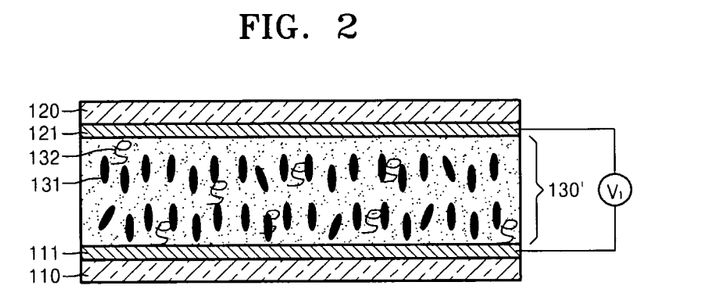

Referring to FIG. 2, a voltage $V_1$ is applied between the first electrode 111 and the second electrode 121. Accordingly, an electric field is applied to the mixture solution 130' interposed between the first electrode 111 and the second electrode 121. When the electric field is applied to the mixture solution 130', the liquid crystals around the liquid crystalline polymers 132 are arranged to be parallel to the electric field (e.g., perpendicular to the first and second substrates 110 and 120). As described above, the liquid crystals around the liquid crystalline polymers 132 maintain their electrical property. Thus, when the liquid crystals around the liquid crystalline polymers 132 are arranged parallel to the electric field, the dichroic dyes 131 around the liquid crystals are arranged according to the movement of the liquid crystals.

Figure 3:
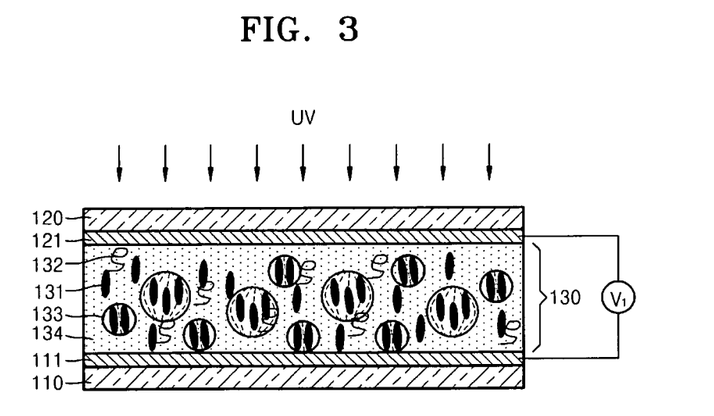

Referring to FIG. 3, the mixture solution 130' is irradiated with ultraviolet rays while the dichroic dyes 131 are arranged parallel to the electric field. The photopolymerizable material in the mixture solution 130' is hardened from a photopolymerization reaction resulting from irradiation with ultraviolet rays and is changed to a polymer 134. Most of the ultraviolet rays incident upon the polymer 134 may contribute to the hardening of the polymer 134. For instance, if the dichroic dyes 131 are arranged randomly in the mixture solution 130', the dichroic dyes 131 continuously absorb ultraviolet rays and, thus, may deteriorate a hardening characteristic of the polymer 134. However, according to example embodiments, when ultraviolet rays are irradiated while the dichroic dyes 131 in the mixture solution 130' are arranged parallel to the electric field, most of the ultraviolet rays may contribute to the hardening of the polymer 134 and, thus, the hardening characteristic of the polymer 134 may be improved.

In the hardening process using ultraviolet rays, liquid crystals 133 in the polymer 134 may be relatively uniformly dispersed through phase separation and, thus, the dichroic dyes 131 and the liquid crystalline polymers 132 may be relatively uniformly dispersed in the polymer 134 and the liquid crystals 133. Thus, the mixture solution 130' may be changed to a PDLC layer 130 including the polymer 134, the liquid crystals 133, the dichroic dyes 131, and the liquid crystalline polymers 132. The dichroic dyes 131 in the liquid crystals 133 and the polymer 134 may be arranged to be parallel to the electric field. Also, because the dichroic dyes 131 in the polymer 134 are fixed while being arranged by the hardening process using ultraviolet rays, the dichroic dyes 131 may not move upon the subsequent application or removal of an electric field.

Figure 4:
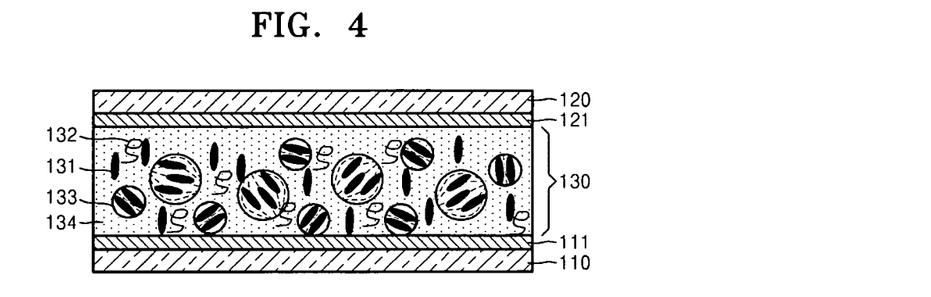

Referring to FIG. 4, when the voltage $V_1$ applied between the first electrode 111 and the second electrode 121 is removed, the manufacturing of the PDLC display device is completed. Accordingly, the electric field applied in the PDLC layer 130 is removed, and the dichroic dyes 131 in the liquid crystals 133 return to a random arrangement. However, even though the electric field is removed, the dichroic dyes 131 within the polymer 134 maintain their arrangement. As illustrated in FIG. 4, when white light is incident onto the PDLC layer 130 through the second substrate 120 and the second electrode 121 while an electric field is not applied to the PDLC display device, the incident white light may be diffused by optical characteristics of the polymer 134 and the liquid crystals 133. The light acts with the dichroic dyes 131 that are randomly arranged in the liquid crystals 133 such that light having the same color as the dichroic dyes 131 is discharged through the second substrate 120. For example, when the dichroic dyes 131 are yellow, yellow light is discharged. The dichroic dyes 131 within the polymer 134 are arranged perpendicular to the first and second substrates 110 and 120.

Figure 5:
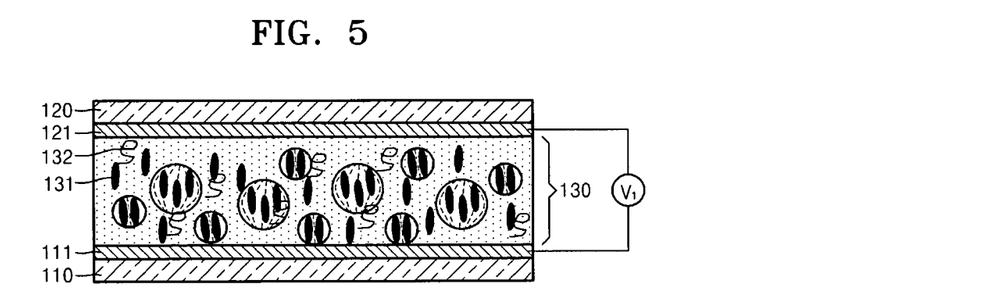
FIG. 5 illustrates the application of an electric field to the PDLC display device of FIG. 4.

FIG. 5 illustrates the application of an electric field to the PDLC display device of FIG. 4. When the voltage $V_1$ is applied between the first electrode 111 and the second electrode 121, an electric field is applied in the PDLC layer 130. As a result of the application of the electric field, the dichroic dyes 131 in the liquid crystals 133 are arranged parallel to the electric field. Thus, when white light is incident onto the PDLC layer 130 through the second substrate 120 and the second electrode 121, the incident white light penetrates the PDLC layer 130 in which the dichroic dyes 131 are arranged parallel to the electric field. Accordingly, the upper part of the second substrate 120 appears to be black. Also, when a reflection layer (not illustrated) is formed under the first substrate 110, white light is discharged through the second substrate 120 by the reflection layer.

As described above, when the dichroic dyes 131 included in the hardened polymer 134 are arranged randomly and fixed, the dichroic dyes 131 in the hardened polymer 134 lose optical anisotropy and adversely affect visibility of the PDLC display device. However, according to example embodiments, the dichroic dyes 131 are arranged in a regular direction and are fixed in the hardened polymer 134. Therefore visibility of the PDLC display device may be improved. Also, when the dichroic dyes 131 are randomly arranged in the mixture solution 130', the dichroic dyes 131 continuously absorb ultraviolet rays and may deteriorate a hardening characteristic of the polymer 134. On the other hand, when ultraviolet rays are incident while the dichroic dyes 131 in the mixture solution 130' are arranged parallel to the electric field, most of the ultraviolet rays may contribute to the hardening of the polymer 134. Thus, a hardening characteristic of the polymer 134 may be improved.

FIGS. 6 through 9 illustrate another method of manufacturing a PDLC display device according to example embodiments. It should be noted that features corresponding to previously-described elements will not be repeated for purposes of brevity. Hereinafter, only differences from the previous example(s) will be described.

Figure 6:
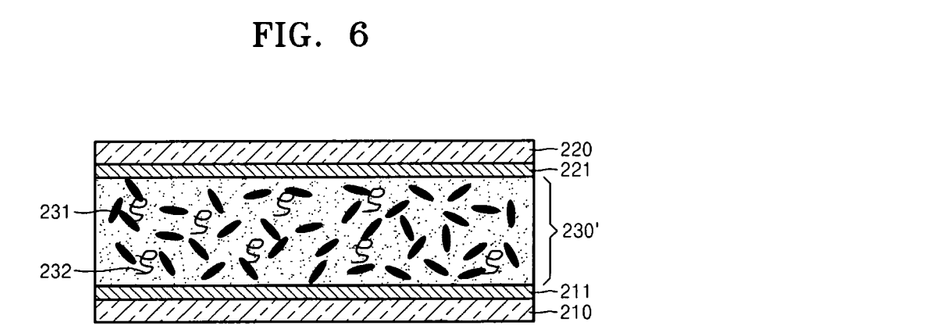
FIGS. 6 through 9 illustrate another method of manufacturing a PDLC display device according to example embodiments.

Referring to FIG. 6, a first electrode 211 and a second electrode 221 may be disposed facing each other at a regular interval. The first and second electrodes 211 and 221 may be formed of a transparent conductive material. The first electrode 211 and the second electrode 221 may be respectively formed on a first substrate 210 and a second substrate 220. The first and second substrates 210 and 220 may be transparent substrates. Although not illustrated, TFTs and driving wirings may be formed on the first substrate 210 along with the first electrode 211. A mixture solution 230' including liquid crystals, a photopolymerizable material, dichroic dyes 231, and liquid crystalline polymers 232 may be filled in the space between the first electrode 211 and the second electrode 221. The photopolymerizable material may include at least one material selected from the group consisting of monomers and oligomers. The concentration of the photopolymerizable material may be about 5 to about 25 weight %, and the concentration of the liquid crystalline polymers 232 may be about 5 to about 25 weight %. However, the concentrations of the photopolymerizable material and the liquid crystalline polymers 232 are not limited thereto.

Figure 7:
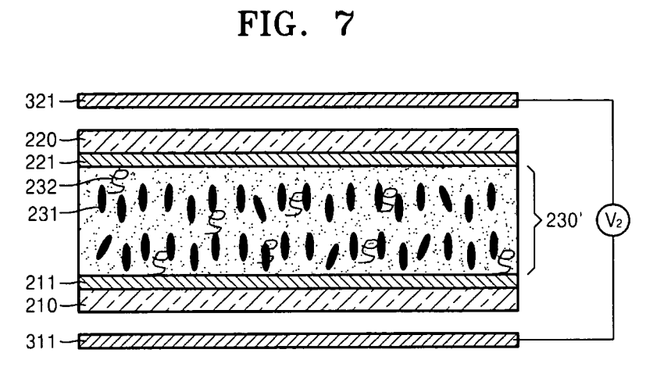

Referring to FIG. 7, a third electrode 311 and a fourth electrode 321 are respectively disposed outside of the first substrate 210 and the second substrate 220. The third electrode 311 may be arranged to be parallel to the first electrode 211, and the fourth electrode 321 may be arranged to be parallel to the second electrode 221. Also, an electrode through which ultraviolet rays may penetrate in a hardening process using ultraviolet rays (which will be described later), from among the third electrode 311 and the fourth electrode 321, may be formed of a transparent conductive material. For example, the fourth electrode 321 may be formed of an indium tin oxide (ITO). A voltage $V_2$ is applied between the third electrode 311 and the fourth electrode 321. Because the third electrode 311 and the fourth electrode 321 are respectively disposed outside of the first electrode 211 and the second electrode 221, the voltage $V_2$ applied between the third electrode 311 and the fourth electrode 321 may be higher than the voltage $V_1$ applied in FIG. 2. Accordingly, an electric field is applied to the mixture solution 230' interposed between the first electrode 211 and the second electrode 221. When the electric field is applied to the mixture solution 230', the liquid crystals around the liquid crystalline polymers 232 may be arranged to be parallel to the electric field (e.g., perpendicular to the first and second substrates 210 and 220).

Figure 8:
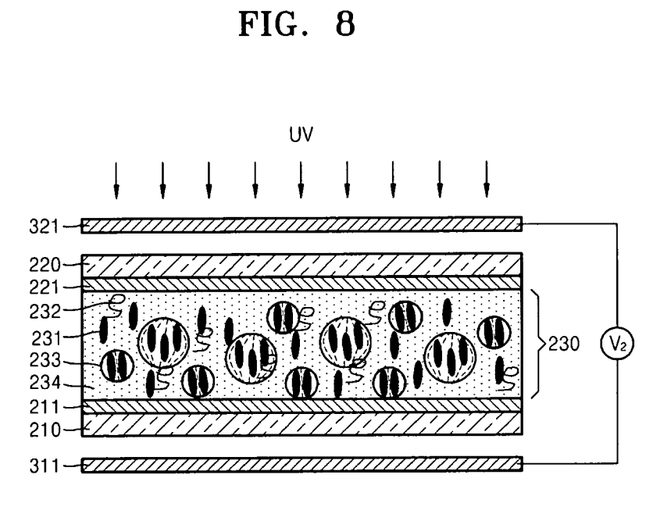

Referring to FIG. 8, the mixture solution 230' is irradiated with ultraviolet rays while the dichroic dyes 231 are arranged parallel to the electric field. The ultraviolet rays may be incident onto the mixture solution 230' by penetrating the fourth electrode 321, the second substrate 220, and the second electrode 221. Because of irradiation by the ultraviolet rays, the photopolymerizable material in the mixture solution 230' is hardened as a result of a photopolymerization reaction and is changed to a polymer 234. In the hardening process using ultraviolet rays, liquid crystals 233 in the polymer 234 are relatively uniformly dispersed through phase separation, and the dichroic dyes 231 and the liquid crystalline polymers 232 are relatively uniformly dispersed in the polymer 234 and the liquid crystals 233. Thus, the mixture solution 230' is changed to a PDLC layer 230 including the polymer 234, the liquid crystals 233, the dichroic dyes 231, and the liquid crystalline polymers 232 by the hardening process using ultraviolet rays. The dichroic dyes 231 in the liquid crystals 233 and the polymer 234 may be arranged to be parallel to the electric field. Also, because the dichroic dyes 231 in the polymer 234 are fixed while being arranged by the hardening process using ultraviolet rays, the dichroic dyes 231 may not move upon subsequent application or removal of an electric field.

Figure 9:
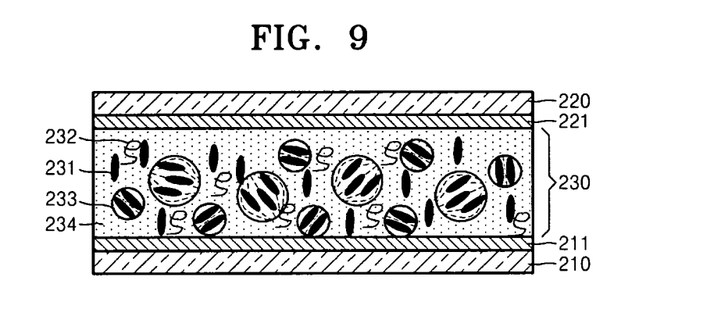

Referring to FIG. 9, the third and fourth electrodes 311 and 321 are removed so as to remove the electric field applied to the PDLC layer 230. As a result, the dichroic dyes 231 in the liquid crystals 233 return to a random arrangement. In contrast, the dichroic dyes 231 within the polymer 234 maintain their arrangement even though the electric field is removed.

Because the TFTs and driving wirings may be formed on the first substrate 210 along with the first electrode 211, it may be difficult to apply a voltage through the first electrode 211. As a result, the third and fourth electrodes 311 and 321 may be separately disposed outside of the first and second electrodes 211 and 221, and the voltage $V_2$ is applied between the third electrode 311 and the fourth electrode 321. Thus, a voltage may be efficiently applied.

FIGS. 10 through 15 illustrate another method of manufacturing a PDLC display device according to example embodiments. It should be noted that features corresponding to previously-described elements will not be repeated for purposes of brevity. Hereinafter, only differences from the previous example(s) will be described.

Figure 10:
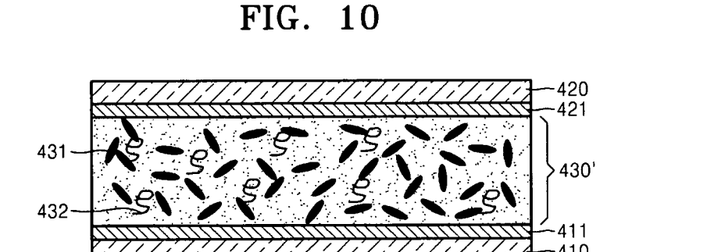
FIGS. 10 through 15 illustrate another method of manufacturing a PDLC display device according to example embodiments.

Referring to FIG. 10, a first electrode 411 and a second electrode 421 may be disposed facing each other at a regular interval. The first electrode 411 and the second electrode 421 may be respectively formed on a first substrate 410 and a second substrate 420. The second substrate 420 (e.g., upper substrate) may be a transparent substrate, and the second electrode 421 may be formed of a transparent conductive material. The first electrode 411 may be only used to apply an electric field and may not be included in the completed PDLC display device. Accordingly, unlike previous example(s), TFTs and driving wirings may not be formed on the first substrate 410 (e.g., lower substrate). A mixture solution 430' including liquid crystals, a photopolymerizable material, dichroic dyes 431, and liquid crystalline polymers 432 is filled in the space between the first electrode 411 and the second electrode 421. The photopolymerizable material may include at least one material selected from the group consisting of monomers and oligomers. The concentration of the photopolymerizable material may be about 5 to about 25 weight %, and the concentration of the liquid crystalline polymers 432 may be about 5 to about 25 weight %. However, the concentrations of the photopolymerizable material and the liquid crystalline polymers 432 according to example embodiments are not limited thereto.

Figure 11:
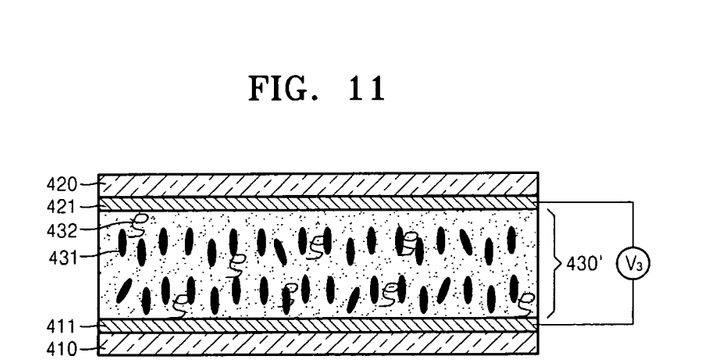

Referring to FIG. 11, a voltage $V_3$ is applied between the first electrode 411 and the second electrode 421. As a result, an electric field is applied to the mixture solution 430' interposed between the first electrode 411 and the second electrode 421. When the electric field is applied to the mixture solution 430', the liquid crystals around the liquid crystalline polymers 432 may be arranged to be parallel to the electric field (e.g., perpendicular to the first and second substrates 410 and 420).

Figure 12:
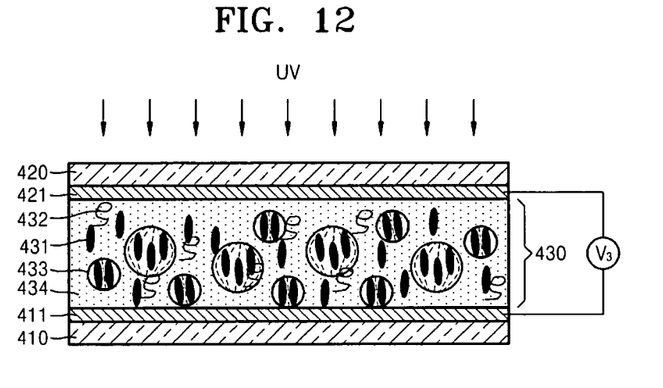

Referring to FIG. 12, the mixture solution 430' is irradiated with ultraviolet rays while the dichroic dyes 431 are arranged parallel to the electric field. As a result of irradiation by ultraviolet rays, the photopolymerizable material in the mixture solution 430' is hardened by a photopolymerization reaction and is changed to a polymer 434. In the hardening process using ultraviolet rays, liquid crystals 433 in the polymer 434 are relatively uniformly dispersed through phase separation, and the dichroic dyes 431 and the liquid crystalline polymers 432 are relatively uniformly dispersed in the polymer 434 and the liquid crystals 433. Thus, the mixture solution 430' is changed to a PDLC layer 430 including the polymer 434, the liquid crystals 433, the dichroic dyes 431, and the liquid crystalline polymers 432 by the hardening process using ultraviolet rays. The dichroic dyes 431 in the liquid crystals 433 and the polymer 434 may be arranged to be parallel to the electric field. Also, because the dichroic dyes 431 in the polymer 434 are fixed while being arranged by the hardening process using ultraviolet rays, the dichroic dyes 431 may not move upon subsequent application or removal of an electric field.

Figure 13:
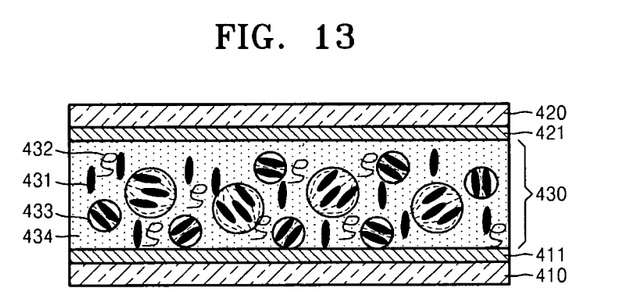

Referring to FIG. 13, when the voltage $V_3$ applied between the first electrode 411 and the second electrode 421 is removed, the electric field applied to the PDLC layer 430 is removed. Accordingly, the dichroic dyes 431 in the liquid crystals 433 return to a random arrangement. In contrast, the dichroic dyes 431 within the polymer 434 maintain their arrangement even though the electric field is removed.

Figure 14:
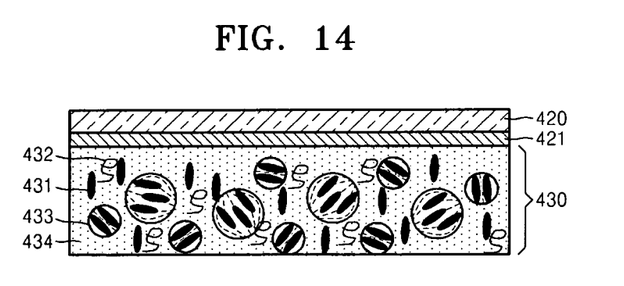

Referring to FIG. 14, the first electrode 411 and the first substrate 410, which were used to apply the voltage $V_3$, are removed from the lower surface of the PDLC layer 430.

Figure 15:
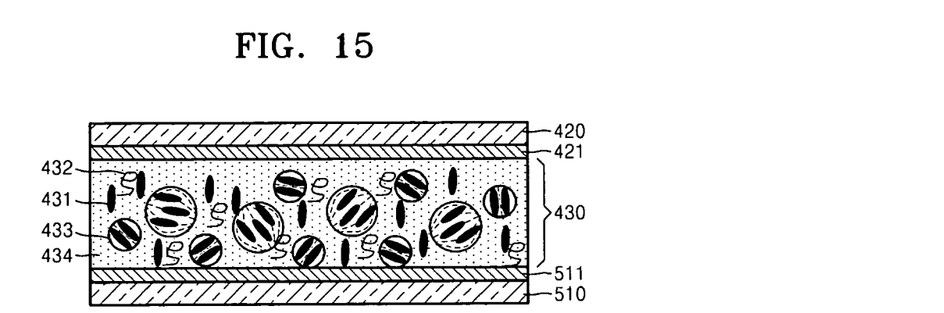

Referring to FIG. 15, a third substrate 510 on which a third electrode 511 is formed is attached to the lower surface of the PDLC layer 430 and the manufacturing of the PDLC display device is completed. Because the third electrode 511 is included in the PDLC display device, TFTs and driving wirings may be formed on the third substrate 510 along with the third electrode 511. The third electrode 511 may be formed of a transparent conductive material, and the third substrate 510 may be a transparent substrate.

As described above, the first electrode 411, which is not part of the completed PDLC display device, may be used to apply the voltage $V_3$ and then subsequently replaced with the third electrode 511, which is part of the completed PDLC display device. Accordingly, the voltage $V_3$ may be relatively efficiently applied.

While example embodiments have been disclosed herein, it should be understood that other variations may be possible. Such variations are not to be regarded as a departure from the spirit and scope of example embodiments of the present application, and all such modifications as would be obvious to one skilled in the art are intended to be included within the scope of the following claims.

What is claimed is:

1. A method of manufacturing a polymer dispersed liquid crystal (PDLC) display device, the method comprising:
   providing a mixture solution including liquid crystals, a photopolymerizable material, dichroic dyes, and liquid crystalline polymers between a first electrode and a second electrode;
   applying an electric field between the first electrode and the second electrode;
   irradiating the mixture solution with ultraviolet rays while the electric field is being applied so as to form a PDLC layer including the liquid crystals, a polymer, the dichroic dyes, and the liquid crystalline polymers; and
   removing the electric field applied between the first electrode and the second electrode.

2. The method of claim 1, wherein the dichroic dyes in the mixture solution are arranged in parallel to the electric field when the electric field is applied between the first electrode and the second electrode.

3. The method of claim 1, wherein the dichroic dyes within the polymer of the PDLC layer maintain their arrangement even after the removal of the electric field.

4. The method of claim 1, wherein a concentration of the liquid crystalline polymers in the mixture solution is about 5 to about 25 weight %.

5. The method of claim 1, wherein a concentration of the photopolymerizable material in the mixture solution is about 5 to about 25 weight %.

6. The method of claim 1, wherein the photopolymerizable material includes at least one material selected from the group consisting of monomers and oligomers.

7. The method of claim 1, wherein the first and second electrodes are formed of a transparent conductive material.

8. The method of claim 1, wherein the first electrode and the second electrode are respectively formed on a first substrate and a second substrate.

9. The method of claim 8, wherein the first and second substrates are transparent substrates.

10. The method of claim 1, further comprising:
    arranging a third electrode and a fourth electrode so as to sandwich the first electrode and the second electrode;
    applying an electric field between the third electrode and the fourth electrode to apply the electric field between the first electrode and the second electrode; and
    removing the third electrode and the fourth electrode.

11. The method of claim 10, wherein a concentration of the liquid crystalline polymers in the mixture solution is about 5 to about 25 weight %.

12. The method of claim 10, wherein a concentration of the photopolymerizable material in the mixture solution is about 5 to about 25 weight %.

13. The method of claim 10, wherein the first and second electrodes are formed of a transparent conductive material.

14. The method of claim 10, wherein the first electrode and the second electrode are respectively formed on a first substrate and a second substrate.

15. The method of claim 10, wherein at least one of the third electrode and the fourth electrode is formed of a transparent conductive material.

16. The method of claim 1, further comprising:
    removing the first electrode from the PDLC layer and providing a third electrode in its place.

17. The method of claim 16, wherein a concentration of the liquid crystalline polymers in the mixture solution is about 5 to about 25 weight %.

18. The method of claim 16, wherein a concentration of the photopolymerizable material in the mixture solution is about 5 to about 25 weight %.

19. The method of claim 16, wherein the second and third electrodes are formed of a transparent conductive material.

20. The method of claim 16, wherein the first electrode is formed on a first substrate, and the second and third electrodes are respectively formed on transparent second and third substrates.

21. The method of claim 1, wherein the dichroic dyes are present in both the polymer and the liquid crystals, an orientation of the dichroic dyes in the polymer being fixed by the irradiating, while the dichroic dyes in the liquid crystals remain mobile and return to a random arrangement after removing the electric field.

* * * * *